United States Patent [19]

Meyerhofer

[11] 3,996,051
[45] Dec. 7, 1976

[54] CONTROLLED ANGLE VIEWING SCREENS BY INTERFERENCE TECHNIQUES

[75] Inventor: Dietrich Meyerhofer, Princeton, N.J.

[73] Assignee: RCA Corporation, New York, N.Y.

[22] Filed: May 29, 1975

[21] Appl. No.: 581,730

Related U.S. Application Data

[62] Division of Ser. No. 446,417, Feb. 27, 1974, Pat. No. 3,909,111.

[52] U.S. Cl. ............................. 96/27 E; 96/27 H; 96/38.3; 96/116; 350/117
[51] Int. Cl.² ......................................... G03C 5/24
[58] Field of Search ................ 96/38.3, 27 H, 116, 96/49, 35, 33, 27 E; 350/117

[56] References Cited
UNITED STATES PATENTS
3,567,444  3/1971  Shankoff ........................... 96/38.3

OTHER PUBLICATIONS
"Hologram Formation in Hardened Dichromated Gelatin Films" Lin, May 1969, vol. 8, No. 5, Applied Optics, 963–966.

Primary Examiner—Mayer Weinblatt
Attorney, Agent, or Firm—George J. Seligsohn; Edward J. Norton

[57] ABSTRACT

A rear projection viewing screen combining high efficiency and uniformity of illumination with predetermined scattering characteristics is constructed through interference techniques. The viewing screen functions as a combination lens and appropriate diffuser.

7 Claims, 1 Drawing Figure

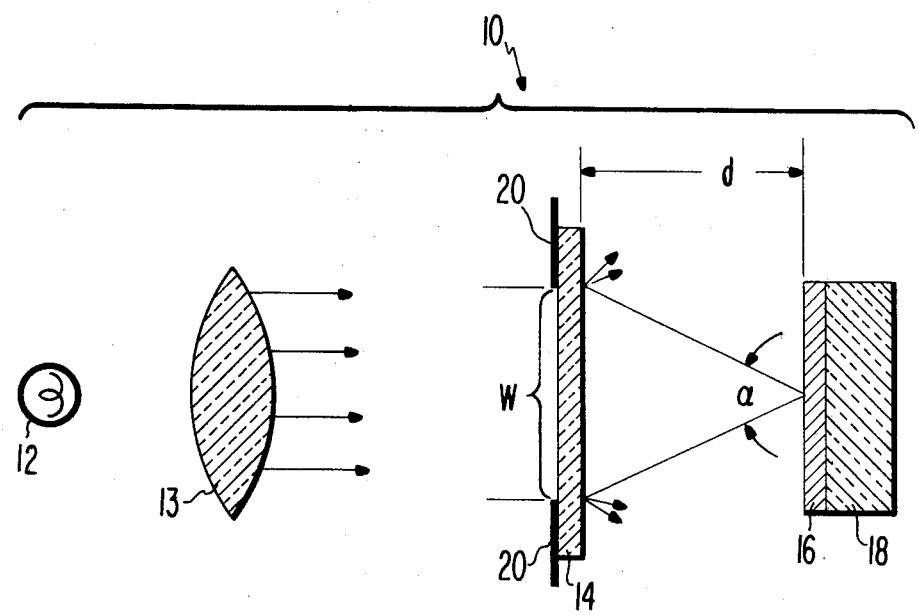

CONTROLLED ANGLE VIEWING SCREENS BY INTERFERENCE TECHNIQUES

This is a division of application Ser. No. 446,417, filed Feb. 27, 1974 now U.S. Pat. No. 3,909,111.

BACKGROUND OF THE INVENTION

This invention relates to a viewing screen combining high efficiency and uniformity of illumination with predetermined scattering characteristics, and particularly to such a screen formed through interference techniques.

In rear projection systems such as slide viewers and microfilm readers, an image is generally projected onto a diffusing screen where it is presented to the observer. Such a rear projection screen is generally viewed near the axis of the system. The diffusing screen should scatter the largest possible fraction of the light towards the observer, i.e., have a high efficiency, thereby requiring a smaller quantity of illumination. The screen must scatter the light not only with high efficiency, but also in such a manner that the intensity of the light reaching the observer from various points on the screen is as uniform as possible, i.e., have predetermined scattering characteristics. Conventional screens, e.g., ground glass, do not scatter the light as desired. Often, conventional screens have the further disadvantage of allowing a hot spot to appear near the center of the screen, causing difficulty to the observer. It would therefore be desirable to develop a screen capable of overcoming the disadvantages of the prior art.

SUMMARY OF THE INVENTION

A method of forming a rear projection viewing screen where the screen combines high efficiency and uniformity of illumination with predetermined scattering characteristics. A hardened gelatin film is prepared on a substrate and then sensitized to light. The gelatin film is then exposed by transmitting substantially coherent light through a diffusing medium and then allowing the light transmitted through the diffusing medium to fall upon the film. The film is then developed.

BRIEF DESCRIPTION OF THE DRAWING

The drawing is an illustration of one form of exposure geometry capable of forming a viewing screen combining high efficiency and uniformity of illumination with predetermined scattering chracteristics through the method of the present invention.

DETAILED DESCRIPTION

Referring initially to the drawing, one form of exposure geometry for forming a rear projection viewing screen having the desired optical properties through the method of the present invention is designated generally as 10. The exposure geometry 10 includes a source 12 of substantially coherent light, e.g., a He-Cd laser, and a diffusing medium 14 of a material having desired scattering characteristics, e.g., ground glass able to scatter in all directions. A lens 13 can be provided to focus the light on the diffusing medium 14. A hardened sensitized gelatin film 16, such as a dichromated gelatin, including ammonium, potassium and sodium dichromated gelatin, is affixed to one surface of a transparent substrate 18, e.g., glass, plastic, etc. It is preferable that ammonium dichromated gelatin be utilized as the film 16, as ammonium dichromate is a well known and easily available photosensitive material. The substrate 18 is positioned wherein the light from the light source 12 first passes through the diffusing medium 14 and then falls incident upon the gelatin film 16 as shown in the drawing.

In the method of the present invention, a hardened gelatin film 16 is first prepared on the substrate 18 with a thickness preferably in the range of 6 to 20 microns. The gelatin film 16 can be prepared on the substrate 18 through the method described by H. Lin in App. Optics 8, 963 (1969), in an article entitled "Hologram Formation in Hardened Dichromated Gelatin Films", although other available methods would be equally successful. According to the method of Lin, a 7% (by weight) solution of gelatin, such as USP powdered gelatin, commercially available from J. T. Baker Corporation, is poured over a glass plate, and the excess solution is permitted to run off the plate. After the film is dry, it is hardened by soaking in a photographic fixer containing a hardener for approximately 3 to 5 minutes, followed by washing in water. By varying the concentration of the gelatin solution and the use of multiple coatings, a film thickness in the range of approximately 1 to 20 microns can be obtained. The hardened gelatin film 16 is then sensitized to light, e.g., soaked in a solution of the dichromate, e.g., ammonium dichromate, as described by Lin in the previously mentioned article.

The hardened, sensitized gelatin film 16 is now ready to be exposed. Exposure can successfully occur as shown in the drawing where the substantially coherent light emitting from the light source 12 falls upon the diffusing medium 14. The light from the light source 12 passes through the diffusing medium 14 and then falls upon the sensitized gelatin film 16. Although the phenomena is not clearly understood, it is believed that the light falling upon the hardened, sensitized film 16 interferes in the hardened, sensitized gelatin film 16 in such a way as to form interference planes wich are randomly oriented in space except that they are all close to perpendicular to the plane of the gelatin layer 16.

It is believed that a further small, localized, hardening occurs in portions of the hardened gelatin film 16 due to increased crosslinking as a result of changes in the state of the chromate ion, as the photons are absorbed. The gelatin film 16 is spaced a distance $d$ from the diffusing medium 14. The diffusing medium 14 includes an area, having a linear dimension W of illumination due to the light emitted from the light source 12. The linear dimension W of illumination on the diffusing medium 14 subtends an angle $\alpha$ on the hardened, sensitized gelatin film 16. From the exposure geometry of the drawing, it is therefore apparent that the angle $\alpha$ is a function of the distance $d$ and the linear dimension W. The diffusing medium 14 and the hardened, sensitized gelatin film 16 are positioned wherein the relation of the linear dimension W to the distance $d$ is such tht the angle $\alpha$ is preferably in the range of 15° to 40°, with approximately 20° producing a viewing screen having the optimum scattering characteristics. The magnitude of the linear dimension W can be varied by employing shutters 20 to permit the light from the light source 12 to reach only a selected portion of the diffusing medium 14 while the distance $d$ is varied by moving either the diffusing medium 14 or the gelatin film 16.

The exposed gelatin film 16 is then developed. The exposed film 16 is first washed in water, dehydrated in isopropyl alcohol, and then dried for about 30 minutes in an atmosphere of about 60% relative humidity, followed by further drying at 30 to 40% relative humidity or at elevated temperatures, e.g., 100° C, whereupon the exposure becomes permanent It is believed that washing in water causes the exposed gelatin layer to expand and that the rapid drying rips apart the gelatin, thereby producing minute cracks where the gelatin layer was not exposed. The drying can be performed with greater reproducibility if the developed film 16 is pulled very slowly from the isopropyl alcohol with a stream of hot air simultaneously directed at the film 16 near the alcohol interface.

The light incident upon the diffusing medium 14 need not be collimated, but may be somewhat diverging from a point source. The incident light must be coherent to such an extent that all the light impinging on a given point on gelatin film 16 has a fixed phase relationship. The coherency requirement depends on the directionality of the diffusing medium 14 and the distance $d$. The distance $d$ can be made as small as desired, even to the point where the diffusing medium 14 contacts the gelatin film 16 wherein the coherency requirement is no serious restriction. Exposure can be made with the He-Cd laser or with various available high pressure mercury arc lamps as the light source 12. In the former case, the light emitted is highly coherent, thereby allowing the diffusing medium 14 to be separated by a long distance $d$ from the gelatin film 16.

The nature of the diffusing medium 16 becomes less important when the diffusing medium 14 is separated by a long distance $d$ from the gelatin film 16 since the divergence of the light exposing the film 16 is determined by the angle $\alpha$. If a mercury lamp is employed as the light source 12, spatial filtering through a pinhole can make the light suitably coherent. The use of mercury lamps would be desirable as they produce collimated light which is more uniform in intensity than that produced by the typical He-Cd laser. Furthermore, mercury lamps are less expensive and less bulky than laser light sources.

Thus, the method of the present invention provides a method of forming a rear projection viewing screen, combining high efficiency and uniformity of illumination with predetermined scattering characteristics. A screen produced by the method of the present invention has properties that are completely symmetric to the plane of the diffuser, and about a line perpendicular to it.

I claim:
1. A method for producing a controlled angle viewing screen by interference techniques, said method comprising the step of:
    exposing a hardened, sensitized gelatin film with incident light which has been passed through an area of a diffusing medium having a given linear dimension which medium is located at a given distance from said film such that said given linear dimension subtends a preselected angle in the range of 15° to 40° on said film, said incident light being coherent to the extent that all the light impinging on any given point of said film has a substantially fixed phase relationship.
2. The method defined in claim 1, wherein said preselected angle is substantially 20°.
3. The method defined in claim 1, further comprising the step of developing said film exposure.
4. The method defined in claim 3, wherein the step of developing includes the steps of washing in water, dehydrating in isopropyl alcohol, followed by rapid drying.
5. The method defined in claim 4, wherein said step of rapid drying comprises the steps of drying for about 30 minutes in an atmosphere of about 60% relative humidity, followed by further drying at 30 to 40% relative humidity.
6. The method defined in claim 4, wherein said step of rapid drying comprises the steps of drying for about 30 minutes in an atmosphere of about 60% relative humidity, followed by further drying at an elevated temperature in the order of 100° C.
7. The method defined in claim 4 wherein said step of development includes the step of slowly pulling said film from said isopropyl alcohol with a stream of hot air simultaneously directed at said film near said alcohol interface.

* * * * *